United States Patent [19]

Martin

[11] 4,359,131
[45] Nov. 16, 1982

[54] METHOD OF GENERATING A SEISMIC SIGNAL EMPLOYING A WATER PISTON

[75] Inventor: Philip N. Martin, Tulsa, Okla.

[73] Assignee: Mapco, Inc., Tulsa, Okla.

[21] Appl. No.: 174,123

[22] Filed: Jul. 31, 1980

Related U.S. Application Data

[63] Continuation-in-part of Ser. No. 963,982, Nov. 27, 1978, Pat. No. 4,223,759.

[51] Int. Cl.³ .............................................. G01V 1/104
[52] U.S. Cl. ..................................... 181/116; 181/401
[58] Field of Search ............... 181/113, 114, 116, 117, 181/119, 121, 401, 402

[56] References Cited

U.S. PATENT DOCUMENTS

| 2,203,140 | 6/1940 | Green .................................. | 181/116 |
| 2,721,617 | 10/1955 | Piety ................................... | 181/116 |
| 3,275,098 | 9/1966 | Filler .................................... | 181/116 |
| 3,489,240 | 1/1970 | Griffith ............................... | 181/401 |
| 4,324,310 | 4/1982 | Wener et al. ....................... | 181/116 |

Primary Examiner—Howard A. Birmiel
Attorney, Agent, or Firm—Head, Johnson & Stevenson

[57]  ABSTRACT

A method of generating a seismic signal by forming a shallow hole in the earth's surface, at least partially filling the hole with liquid, positioning a projectile firing apparatus over the hole and firing a projectile downward into the hole impacting the liquid therein.

13 Claims, 5 Drawing Figures

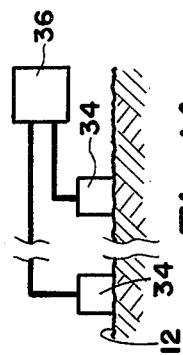
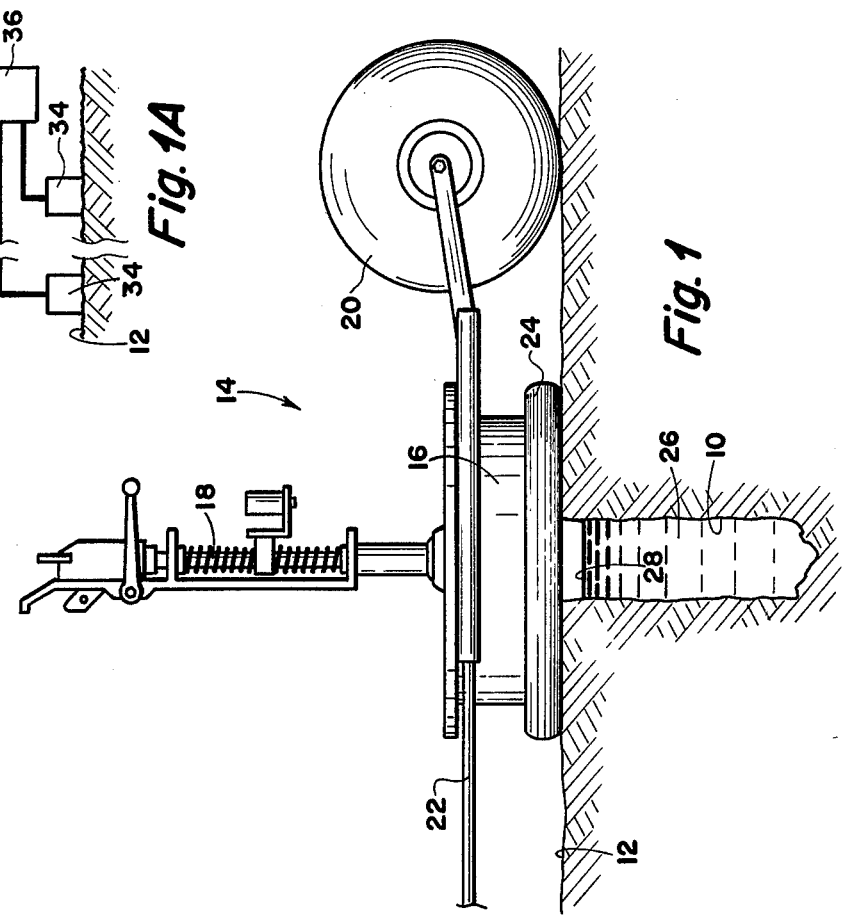
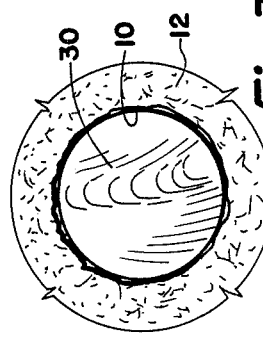
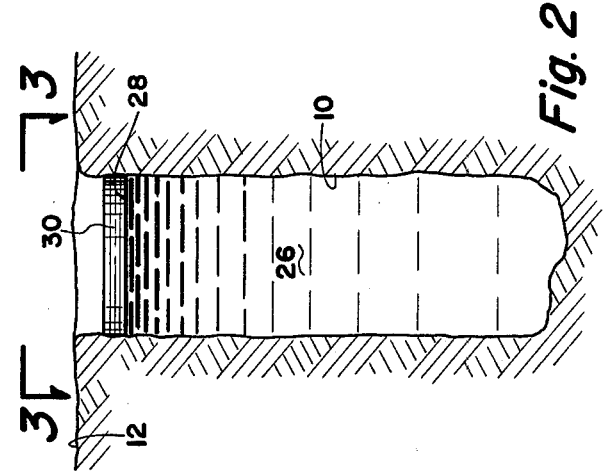

METHOD OF GENERATING A SEISMIC SIGNAL EMPLOYING A WATER PISTON

CROSS-REFERENCE TO RELATED APPLICATION

This application is a continuation-in-part of my copending application, Ser. No. 963,982, U.S. Pat. No. 4,223,759, filed Nov. 17, 1978, entitled "Low Energy Source for Seismic Operations" which is incorporated herein by reference.

BACKGROUND OF THE INVENTION

1. Field of the Invention

This invention relates to a method of generating seismic signals for use in geophysical mapping and prospecting. The method employs a projectile firing gun and includes means of improving the transfer of energy from the projectile to the earth's surface to enhance the amplitude and quality of the seismic signal generated.

2. Description of the Prior Art

A variety of different means of generating seismic signals have been known and practiced in the art such as vibrators, dynamite, detonating cord, air guns and weight drop units. The referenced parent application provides a unique arrangement for generating seismic signals in which a projectile is fired into the earth. The impact of the projectile generates a seismic signal. Reflections from the seismic signals detected by geophones positioned on the earth can be used to provide information as to the depth and contour of subterranean stratas.

When using the seismic energy signal method and apparatus of the referenced parent application, the quality and amplitude of the signal is determined by the nature of the surface of the earth at the point of the projectile impact. The characteristics of the earth's surface varies substantially from one position to another. Some spots on the earth are very hard, consisting of layers of exposed rock. Other areas are spongy, such as areas high in vegetable matter content. Even at the same location, weather conditions can change the characteristic of the earth's surface. For instance, if the surface is frozen, the nature of the impact of a projectile is completely different from the same spot under high temperature conditions wherein the spot may be either relatively dry but unfrozen or may be spongy or substantially saturated with water.

A particular problem is encountered when a spongy type surface exists such as a surface having lush vegetation. The impact of the fired projectile is absorbed over a longer stretch of time compared with the impact of a hard surface, and therefore, the amplitude of the seismic signal is substantially diminished. In addition, the characteristic of the signal is affected.

The present invention is directed towards a method of generating a seismic signal and of seismic exploration utilizing such generated seismic signal, including means of improving the amplitude and quality of seismic signals obtained from a fired projectile.

It is therefore an object of this invention to provide an improved method of generating a seismic signal and improved means of seismic exploration utilizing such improved signals.

More particularly, an object of this invention is to provide a method of generating a seismic signal in which the nature of the surface of the earth at the point where a projectile is to be fired into the earth can be altered in an expeditious manner to thereby create seismic signals of greater amplitude and more uniform character.

These general objects as well as other and more specific objects of the invention will be fulfilled in the following description and claims, taken in conjunction with the attached drawings.

SUMMARY OF THE INVENTION

This invention provides a method of generating a seismic signal and a method of seismic exploration. The first step in generating a seismic signal is forming a shallow hole in the earth's surface which may be typically about four inches in diameter and 6 to 12 inches deep. Next, the hole is filled or at least partially filled with a liquid, preferrably water. A projectile firing apparatus is positioned over the hole and a projectile is fired downwardly to impact against the liquid in the hole. The impact forms a seismic signal which is conveyed by the liquid to the earth, the seismic signal traveling in the earth. By means of seismic detecting devices such as geophones, reflected signals may be detected to provide information as to the subterranean structure.

The liquid in the hole may be merely poured into place or, if the earth is porous so that the liquid would disappear or reduce in depth significantly before a projectile could be fired into the hole, then the water may be retained in a flexible bag.

A significant improvement in the method includes positioning a disc of solid material, such as wood, onto the top of the liquid. The projectile impacts on the disc forming an instantaneous piston effect.

DESCRIPTION OF VIEWS

FIG. 1 is an elevational view of an apparatus for firing a projectile to generate a seismic signal showing, in cross-section, a water-filled hole formed in the earth as employed in practicing the invention.

FIG. 2 is a cross-sectional view of the earth's surface showing a hole formed therein and showing the use of a disc of solid material on the surface of the liquid.

FIG. 3 is a plan view taken along the line 3—3 of FIG. 2 showing the disc positioned on the liquid in the hole.

DETAILED DESCRIPTION

Figure 4:
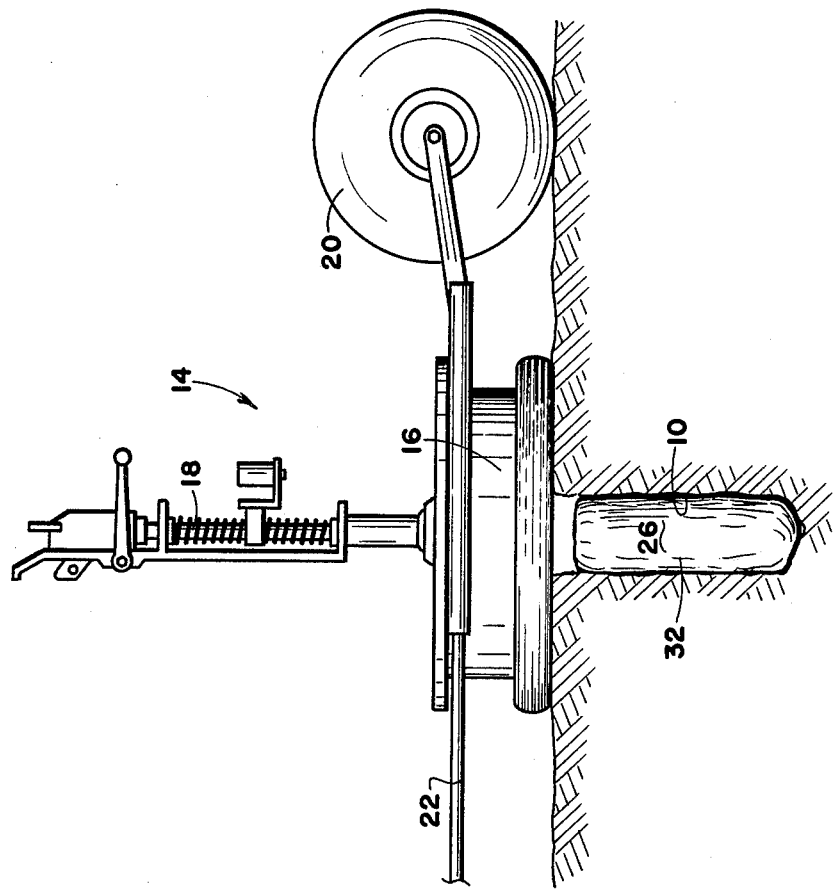
FIG. 4 is an elevational view as in FIG. 1 and showing the earth's surface in cross-section and showing the arrangement wherein the liquid is contained in a bag of flexible material positioned in the hole.

Referring to the drawings and first to FIG. 1, the steps employed in the method of the invention will be described. The object of the invention is to provide improved generation a seismic signal for conducting seismic exploration. The first step in the method is the formation of a shallow hole 10 in the surface of the earth 12.

The apparatus for firing a projectile is generally indicated by the numeral 14 and includes a base 16 which supports a gun 18. In order to facilitate movement of the device upon the earth's surface, a wheel 20 is employed and handlebars 22 extend from the base in the direction opposite the wheel. It is understood that the invention herein is not concerned with the specific arrangement for firing of a projectile into the earth but is a method of employing a projectile firing device to increase the amplitude and quality of the seismic signal generated thereby.

The base 16 of the projectile firing apparatus 14 typically includes a lower surface 24 which rests on the earth's surface 12 to form means to intercept dirt, rocks, mud, water, snow, etc., which may be kicked upwardly as a projectile impacts on the earth. In the normal application of the projectile firing apparatus 14 it is merely positioned on the surface of the earth at the spot where the seismic signal is desired and the projectile fired downwardly into it. Since the characteristics of the specific spot on the earth where the projectile impacts may vary significantly, the amplitude and quality of the seismic signal can vary. The present invention contemplates forming the hole 10 in the earth at the point where the projectile is to impact. The hole should be of sufficient diameter so that it is easy to position the projectile firing apparatus 14 over it to be certain that the projectile will impact into the hole. After the hole 10 is formed, it is filled with liquid 26. While nearly any kind of liquid may function for the purposes of this invention the obvious choice is water since it is the most economical and readily available of all liquids and it has the desirable characteristic of being substantially incompressible. At the present time it is believed that from a practical standpoint, water is superior to any other known liquid but obviously the invention is not so limited.

After the hole 10 is formed and filled with liquid 26, the projectile firing apparatus 14 is moved into position and, when the geophones and recording equipment, such as illustrated in FIG. 1A, is ready to receive and record reflected seismic signals, the apparatus 14 is actuated to fire a projectile. The projectile travels downwardly and impacts on the liquid surface 28. This impact transfers energy from the projectile to the earth. By the provision of liquid 26, the transfer of energy is improved over that which is achieved in many types of earth such as spongy soil including a significant portion of vegetable matter and so forth. Loose gravel and loose sand also are not good conductors of seismic energy and the use of the water-filled hole under these conditions improves the quality and amplitude of the seismic signal which is generated.

The diameter of hole 10 may vary considerable but preferably is of the size so that the projectile firing device can easily be positioned over it. At a minimum, the diameter of hole 10 must be the diameter of the projectile itself. A convenient diameter is about 4 inches although certainly any diameter from two inches to greater will function satisfactorily.

The depth of the hole 10 is not critical but should be that which is sufficient so that substantially all of the kinetic energy of the projectile is absorbed in the liquid. A very shallow depth will not absorb a significant portion of the impact and is not desirable. It has been determined that a depth of six inches or greater is usually sufficient to absorb most of the kinetic energy of a projectile. Once the significant portion of the projectile energy is absorbed a greater depth of the hole 10 becomes less important. It is therefore necessary only that the hole 12 be of a depth so that preferably at least about six inches of liquid is in the hole at the time the projectile is fired.

The only advantage of a deeper hole than that which extracts a substantial portion of the projectile kinetic energy is that it helps transfer the seismic signal by the liquid column into a deeper area of the earth's surface. Only if the surface where the projectile is fired is spongy for a greater than normal depth is a deeper hole required. Since most loose formations such as gravel or sand do not normally extend below about 12 inches, a depth of liquid of 12 inches is therefore usually satisfactory. When the proper hole depth is questionable for a particular soil condition, holes of varying depths can be readily made and the amplitude of the seismic signals measured so that in any geographical area the desired depth of hole 10 can be expeditiously determined.

Referring to FIGS. 2 and 3, an improved method of practicing the invention is illustrated. FIG. 2 shows hole 10 formed in surface of earth 12 filled with liquid 26. Positioned on the surface 28 of the liquid is a disc of solid material 30. The disc 30 may be formed of any solid material such as wood, plastic, metal, and so forth. An ideal arrangement is the fabrication of disc 30 of wood and plywood is preferred. The disc 30 is preferably of a diameter slightly less than the diameter of hole 10 and also, is preferably of specific gravity less than that of liquid 26. In this manner, the disc 30 can be floated on surface 28. When the disc 30 is made of material having a specific gravity greater than liquid, it must be configured so that it will be retained within the hole 10, such as by lodging against the sides of the hole. The disc 30 does not necessarily need to be positioned precisely on the surface of liquid 28. It may be positioned slightly below the surface such that a small depth of liquid exists above the disc. However, the most expedient method of practicing the invention is to construct disc 30 of fairly strong material, such as plywood, which floats on the surface of the liquid. In this way the disc may simply be deposited on the surface of the liquid after the hole is filled.

When disc 30 is formed of wood, such as plywood, it may be of a thickness such as from ¼ inch to one inch. If formed of thickness such as ½ inch, two or more discs may be stacked on top of each other if greater thickness is required. This enables the operator to expeditiously determine as to each environment in which the method is used the thickness of the disc which produces the best results.

Constructing the disc 30 of wood, such as plywood, has several advantages. First is that of economy since the disc may be formed even of scrap plywood. Second, the discs are relatively light and large quantities required for multiplicity of shots can be easily transported by a geophysical prospecting crew. Third, plywood discs are of fairly high structural strength compared to their weight. Fourth, the plywood discs are biodegradable so as to not form a contaminant such as would occur if metal or nondegradable plastic or other materials is employed.

When a disc is employed such as illustrated in FIGS. 2 and 3, the projectile fired by apparatus 14 engages the disc 30 which functions momentarily as a piston. The impact of the projectile is thereby spread over the area of the disc to more effectively transmit the kinetic energy of the projectile into a seismic energy signal. Tests have demonstrated that the use of discs 30 provides seismic signals of improved amplitude and quality for seismic exploration compared with firing the projectile directly into the surface of the liquid as in FIG. 1.

FIG. 4 shows a different embodiment of the invention. In many environments it may not be feasible to fill hole 10 directly with liquid since the porosity of the soil may permit the liquid to quickly leak away before the projectile firing apparatus 14 can be properly positioned and the record receiving and recording equipment readied for firing the projectile. In addition, where the soil has high porosity a large volume of water may be required in a day's operation where many shots may be employed. To overcome these problems, the liquid may be retained in a flexible bag 32. Bags 32 are preferably formed of thin plastic material which are readily commercially available. The bags 30 may be filled with liquid prior to positioning in hole 10 or the lower portion of the bags may be inserted into the hole 10 and the liquid then added to the bag. The top of the bag may be merely left open or it may be twisted closed and a rubber band or tie may be placed around the closed top to fully contain the liquid. By the use of highly flexible material forming bag 32 the contact of the bag with the surface of hole 10 is highly effective in transmitting energy from the liquid to the earth.

Figure 5:
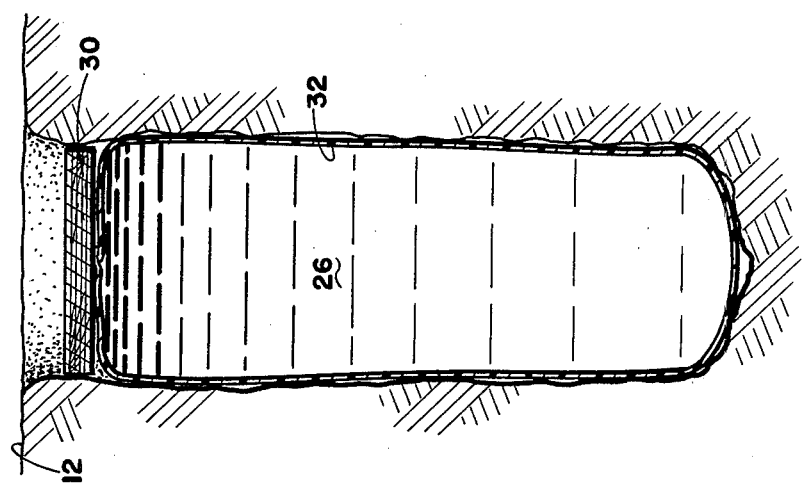
FIG. 5 is a cross-sectional view as shown in FIG. 2 showing a bag of flexible material containing the liquid in the hole and showing the disc positioned against the upper surface of the bag.

FIG. 5 shows the arrangement of FIG. 4 but wherein a disc 30 is positioned in hole 10 in contact with the top of the liquid filled bag 32. When using a flexible bag 32 as in FIG. 5, a wider variety of materials for construction of disc 30 may be employed since materials having a specific gravity greater than liquid 26 may be utilized without concern of supporting the disc within the hole 10. However, even when used in conjunction with flexible bag 32, discs of material such as plywood have been demonstrated to be as effective as other type materials for achieving the desired results.

FIG. 1A shows diagrammatically the use of the steps of the method of this invention for seismic exploration. Positioned on the earth's surface 12 at points remote from the hole 10 which is to receive the impact of a fired projectile are geophones 34 which serve to receive reflected seismic energy. Signals from the geophones are conveyed to a recorder 36 so that the time variations and intensities of the refelected signals may be compared utilizing processes and techniques which are well known in the exploration geophysical profession. While two geophones 34 are illustrated, only one may be employed or a great number, depending upon the techniques being used.

An important advantage of the use of a liquid column is the generation of a seismic signal from the impact of a projectile is that the force of impact is transferred to the earth by each equal unit surface area of the water column. When a projectile impacts the water column, an instantaneous piston effect is achieved, which is augmented when a disc is used as has been described, to instantaneously raise the hydraulic pressure of the liquid. The fluid in the hole being a continuous media, it follows that pressures imposed at the point of slug impact in fluid will be transmitted undiminished to all other points in the fluid. Thus the liquid column greatly increases the coupling of the slug impact to the earth, resulting in a significant increase in the amplitude of the seismic signal generated.

Tests indicate that a 3 ounce dead slug of ⅜" diameter and 15/16 inches length fired into a water-filled hole resulted in maximum slug spreading to be about 2½ inches when driven downward through one to two feet of water. Wooden discs recovered after water piston shots invariably show that the unspread lead slug passes through, often splintering the disc with full spreading of the lead slug evidently taking place at some inches of depth in the nearly incompressible water. The faster and wider the slug spreads, certainly the more effective piston it becomes.

An alternate embodiment of the invention includes the use of wooden or other discs secured by spider configured wires in the hole some depth, such as 6 inches, below the water surface. In this way, the slug will have expanded in cross-sectional area by the time it engages the disc to thereby transfer more of the remaining slug kinetic energy to the disc.

An effective hole for providing a fluid piston can easily be made by a steel rod of about 3 inches in diameter and tapered to a point. The rod can be easily driven into most ground to a depth of 2 feet or so, and withdrawn. When a liquid filled container is employed, a larger diameter hole is more convenient.

Whether the invention is practiced by filling a hole with liquid and discharging the projectile on the surface of the liquid as in FIG. 1, or a disc to form a piston arrangement is employed as in FIG. 2, or a bag is utilized to retain the liquid as in FIGS. 4 and 5, the principle of the invention is the same; that is, improved amplitude and quality of seismic signals are achieved by more effectively coupling the kinetic energy of the projectile into the earth. The invention thus achieves the objectives initially set forth and provides an improved means of economically and expeditiously generating seismic signals for geophysical exploration and mapping.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

I claim:

1. A method of generating a seismic signal comprising:
   forming a shallow hole in the earth's surface;
   at least partially filling the hole with liquid;
   positioning a projectile firing apparatus over the hole; and
   firing a projectile downwardly into the hole, the projectile leaving the firing apparatus and impacting the liquid therein.

2. The method of generating a seismic signal according to claim 1 wherein said step of at least partially filling the hole with liquid includes positioning a liquid containing flexible container in the hole, the projectile impacting the flexible container.

3. The method of generating a seismic signal according to claim 1 wherein the diameter of the hole is at least equal to the diameter of the projectile.

4. The method of generating a seismic signal according to claim 1 wherein the projectile is about 21 mm in diameter and the hole in the earth is about 3" in diameter, and about 4 to 12 inches deep.

5. A method of generating a seismic signal according to claim 1 including the step of:
   positioning a disc of solid material in the hole prior to firing the projectile.

6. A method according to claim 5 wherein the disc is of material having specific gravity less than the liquid in the hole, and wherein the step of positioning a disc includes floating the disc on the surface of the liquid within the hole.

7. A method according to claim 6 wherein the liquid is water and the disc is of wood.

8. A method according to claim 6 wherein the disc is about ¼" to ¾" thick.

9. A method according to claim 2 including the step of:
   positioning a disc of solid material within the hole and in engagement with and above the liquid filled container.

10. A method of seismic exploration comprising:
    forming a shallow hole in the earth;
    at least partially filling the hole with liquid;
    positioning a projectile firing gun over the hole;
    firing a projectile from the gun downwardly, the projectile leaving the gun to impact on the water and generate a seismic signal; and
    detecting reflection of the seismic signal.

11. The method of seismic exploration according to claim 1 including the step of:
    positioning a disc of solid material in the hole, the projectile impacting on the disc and transferring energy thereby to the liquid and thence to the earth forming a seismic signal.

12. A method of seismic exploration comprising:
    forming a shallow hole in the earth;
    placing in the hole a flexible bag containing liquid;
    positioning a projectile firing gun over the hole;
    firing a projectile from the gun downwardly to impact on the bag of liquid, the impact being transferred by the liquid to the earth forming a seismic signal; and detecting reflections of the seismic signal.

13. The method of seismic exploration according to claim 12 including the step of:
    positioning in the hole and on top of the bag of liquid a disc of solid material, the projectile impacting on the disc and transferring energy thereby to the liquid and thence to the earth forming a seismic signal.

* * * * *